United States Patent [19]
Crall et al.

[11] Patent Number: 5,725,355
[45] Date of Patent: Mar. 10, 1998

[54] ADHESIVE BONDED FAN BLADE

[75] Inventors: David W. Crall, Loveland; Christopher C. Glynn, Hamilton; Bruce C. Busbey, Loveland; Jack W. Baldwin, West Chester; Ian F. Prentice, Cincinnati, all of Ohio

[73] Assignee: General Electric Company, Cincinnati, Ohio

[21] Appl. No.: 762,759

[22] Filed: Dec. 10, 1996

[51] Int. Cl.⁶ .................................................. F04D 29/38
[52] U.S. Cl. ............................................... 416/229 A
[58] Field of Search ........................... 416/229 R, 229 A

[56] References Cited

U.S. PATENT DOCUMENTS

| | | | |
|---|---|---|---|
| 1,762,352 | 6/1930 | Ray | 416/232 |
| 2,642,263 | 6/1953 | Thorp | 416/233 |
| 2,698,666 | 1/1955 | Camping et al. | 416/233 |
| 2,786,538 | 3/1957 | Blackburn et al. | 416/233 |
| 2,882,974 | 4/1959 | Boegehold | 416/233 |
| 3,606,580 | 9/1971 | Kaufman | 416/232 |
| 4,188,171 | 2/1980 | Baskin | 416/229 R |
| 4,262,172 | 4/1981 | Mouille et al. | 416/229 R |
| 4,648,921 | 3/1987 | Nutter, Jr. | 416/229 R |
| 4,971,521 | 11/1990 | Atarashi et al. | 416/233 |
| 5,429,977 | 7/1995 | Eylon | 428/586 |
| 5,498,137 | 3/1996 | El-Aini et al. | 416/229 A |

FOREIGN PATENT DOCUMENTS 2026622  2/1980  United Kingdom ............... 416/229 A

*Primary Examiner*—John T. Kwon
*Attorney, Agent, or Firm*—Andrew C. Hess; Patrick R. Scanlon

[57] ABSTRACT

A fan blade includes a spar having first and second opposite sides. The spar sides include a fatigue-life enhanced surface layer, with the spar first side having a cavity bounded in part by the surface layer. A skin closes the cavity and is bonded to the spar for maintaining the enhanced surface layer inside the cavity.

13 Claims, 2 Drawing Sheets

ADHESIVE BONDED FAN BLADE

The U.S. Government has rights in this invention in accordance with Contract No. 00140-90-C-1546 awarded by the Department of the Navy.

BACKGROUND OF THE INVENTION

The present invention relates generally to aircraft gas turbine engines, and, more specifically, to fan rotor blades therein.

A turbofan gas turbine engine includes in serial flow communication a fan, axial compressor, combustor, high pressure turbine powering the compressor, and a low pressure turbine powering the fan. The fan may have one or more stages of rotor fan blades extending radially outwardly from a supporting rotor disk. The fan blades may be either integrally formed with the rotor disk in the form of a one-piece blisk, or each fan blade may have an integral dovetail for removably mounting the blades to the perimeter of the rotor disk.

During operation, the fan blades rotate and generate substantial centrifugal loads which are carried radially inwardly through the blades to the supporting rotor disk. Wide chord fan blades are typically thick with low aspect ratios defined by span-to-chord length. When formed of solid metal, these wide chord fan blades have an undesirable weight penalty requiring corresponding accommodations for carrying the high centrifugal loads generated during operation.

To reduce the weight penalty, wide chord fan blades may be formed of lightweight composite materials, or may be made hollow. These solutions, however, are quite expensive to institute since they require considerable start-up manufacturing costs.

For example, hollow metallic fan blades may be formed using various processes including superplastic forming and diffusion bonding. In one process, the individual fan blades may be formed in two halves and suitably fused together for obtaining an integral structural assembly for carrying the centrifugal loads during operation. The blade halves may be joined by conventional diffusion bonding, welding, or brazing which are all high temperature bonding or fusing techniques which adversely affect the microstructure of parent metal material.

More specifically, metal fan blades typically undergo surface treatment for enhancing fatigue life by providing a compressive surface layer thereon such as that provided by conventional shot peening. The shot peened surface layer significantly enhances fatigue life of the fan blades. However, the elevated temperatures associated with diffusion bonding, welding, and brazing, for example, relieve the shot peened surface layer and therefore destroy its effectiveness. Accordingly, additional shot peening would then be required to restore the compressive surface layer, or shot peening must be done after the fusion bonding.

Since hollow metal fan blades have internal surfaces that are not typically accessible from the outside, the heat compromised surface layers therein cannot again be shot peened to restore their effectiveness. Furthermore, the bonded joints between the blade halves are not subject to internal inspection for identifying any voids or defects therein which could provide undesirable crack initiation sites leading to crack growth through the parent blade material. Accordingly, fusion bonded hollow fan blades may not enjoy the benefits of fatigue life enhancing shot peening which limits their usefulness. And, the inability to readily inspect the fused joints thereof also compromises their practical use.

Accordingly, an improved fabricated hollow fan blade is desired for overcoming these problems.

SUMMARY OF THE INVENTION

A fan blade includes a spar having first and second opposite sides. The spar sides include a fatigue-life enhanced surface layer, with the spar first side having a cavity bounded in part by the surface layer. A skin closes the cavity and is bonded to the spar for maintaining the enhanced surface layer inside the cavity.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
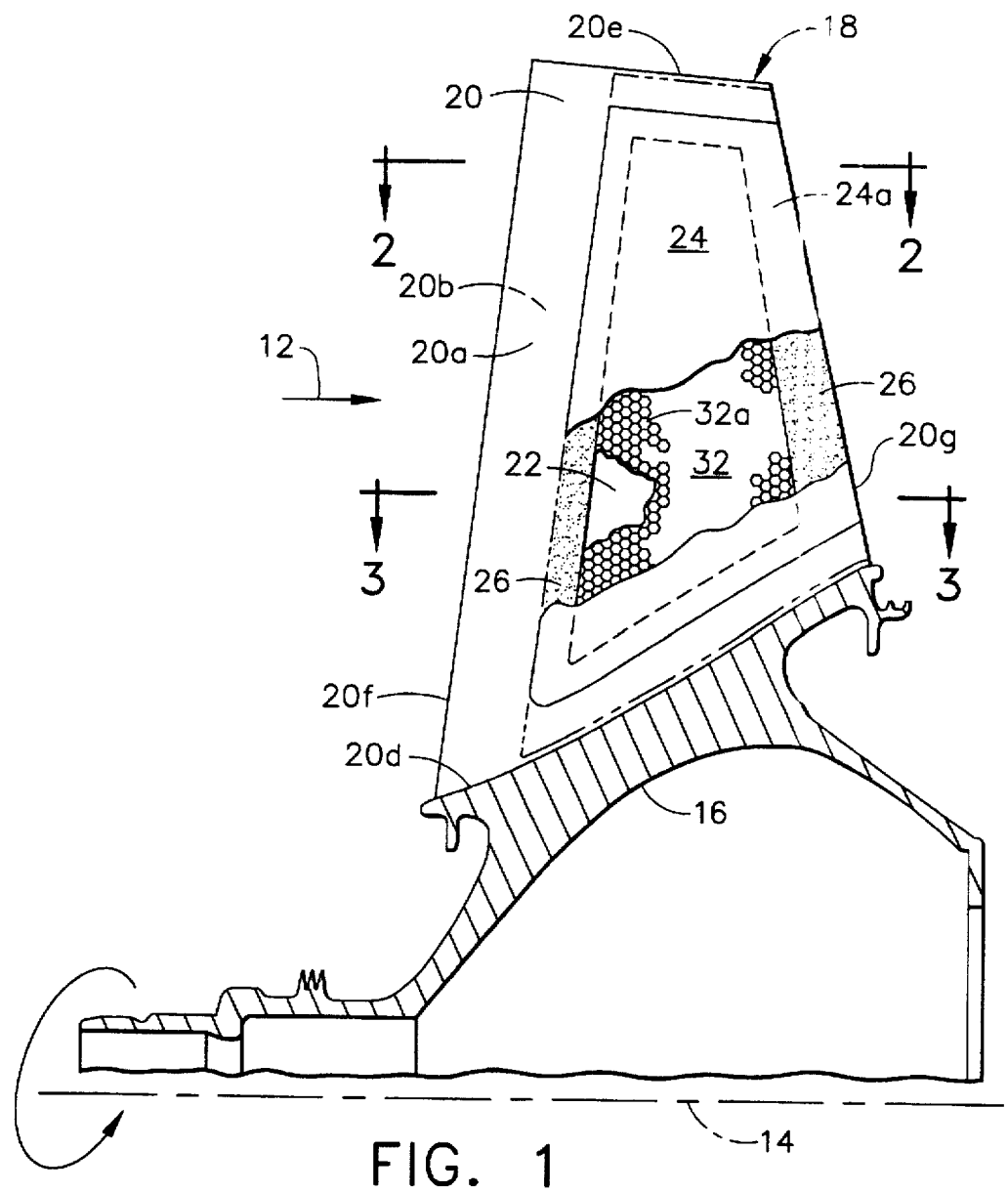
FIG. 1 is a partly sectional, axial-axis or meridional view of an exemplary disk mounted fan rotor blade including a spar and attached skin in accordance with an exemplary embodiment of the present invention.

Illustrated in FIG. 1 is a fan 10 of a turbofan gas turbine engine (not shown) over which flows air 12 which is compressed thereby for propelling an aircraft (not shown) in flight. The fan 10 is axisymmetrical about a longitudinal or axial centerline axis 14 about which it rotates during operation.

The fan includes a rotor disk 16 having a perimeter from which extend radially outwardly a plurality of circumferentially spaced apart rotor fan blades 18 configured in accordance with one embodiment of the present invention. The fan blades 18 may be integrally formed with the rotor disk 16 in a one-piece component known as a blisk as illustrated, or the fan blades 18 may be individually formed and include integral dovetails (not shown) for removably joining the individual blades to the rotor disk 16 in any conventional manner.

In accordance with the present invention, each fan blade 18 includes a structural spar 20 suitably joined to the perimeter of the disk 16 by being integrally formed therewith or by having an integral dovetail as described above. The spar 20 includes one or more recesses or cavities 22 for reducing the weight of the blade 18, with the cavity 22 being open from one side. A cover sheet or skin 24 closes or bounds the cavity 22, and suitable means including an adhesive 26 are provided for bonding or attaching the skin 24 to the spar 20 without compromising the metallurgical and strength characteristics of the spar 20.

Figure 2:
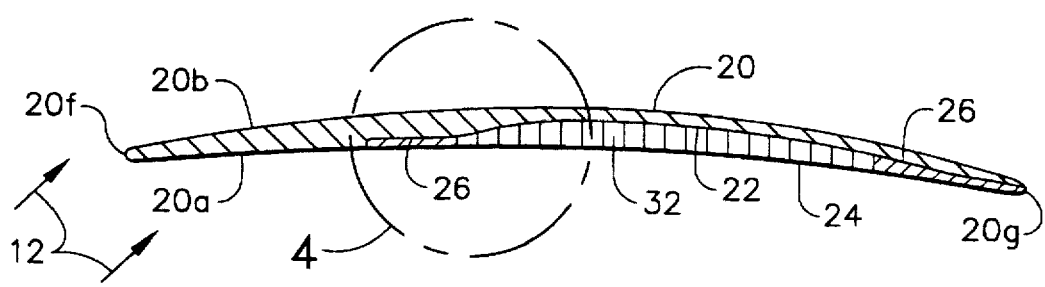
FIG. 2 is a radial sectional view through a tip region of the fan blade illustrated in FIG. 1 and taken generally along line 2—2.
Figure 3:
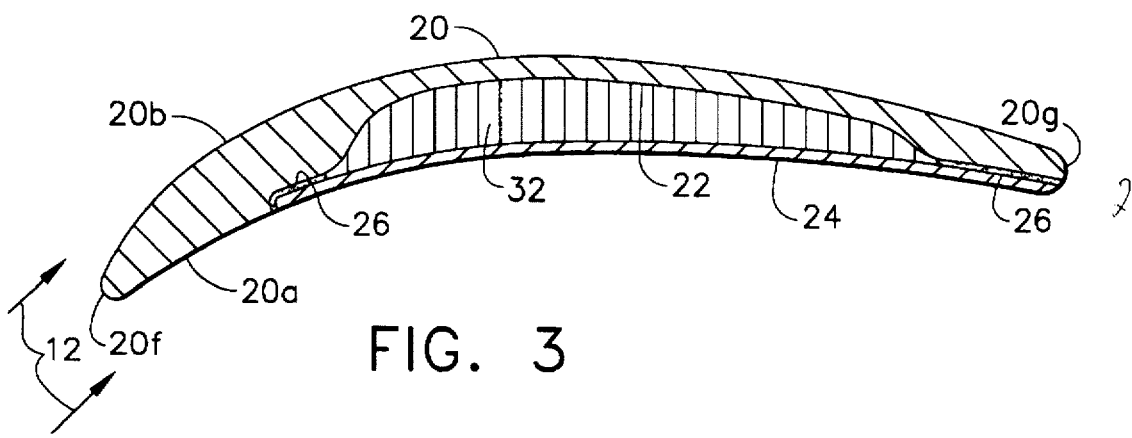
FIG. 3 is a radial sectional view through a root region of the fan blade illustrated in FIG. 1 and taken generally along line 3—3.
Figure 4:
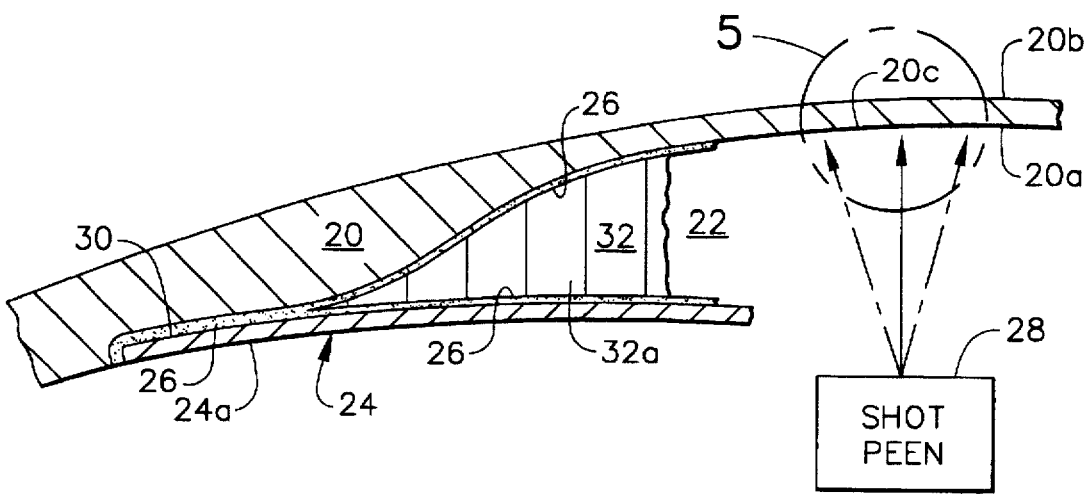
FIG. 4 is an enlarged, partly sectional and schematic view of the mid-chord portion of the fan blade illustrated in FIG. 2 within the phantom circle labeled 4 illustrating a shot peened surface layer thereof.

More specifically, FIGS. 2 and 3 illustrate exemplary sectional views of the fan blade 18 which varies in profile and curvature along its radial or span axis. FIG. 4 is an enlarged view of a representative portion of the fan blade 18 illustrating certain details thereof. And, FIG. 5 is a further enlarged view of a portion of the spar 20 schematically illustrating the use of a conventional shot peening apparatus 28 for enhancing the fatigue life of the spar 20.

Figure 5:
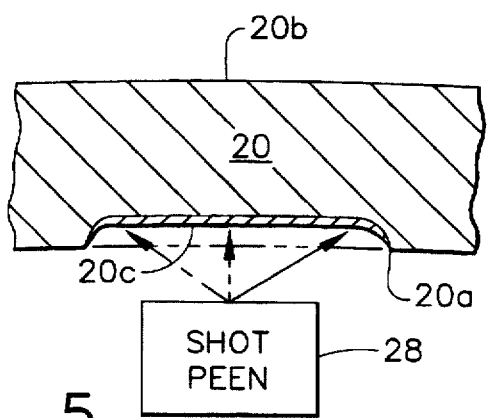
FIG. 5 is an enlarged, sectional view of a portion of the spar illustrated in FIG. 4 within the phantom circle labeled 5 shown in formation of the shot peened surface layer thereof.

Referring firstly to FIGS. 4 and 5, the spar 20 includes first and second opposite sides 20a,b, which sides include a fatigue-life enhanced surface layer 20c preferably over the entire surface area thereof, with an exemplary portion being formed by shot peening as shown in FIG. 5. During the manufacturing process, both sides 20a,b of the spar 20 are conventionally shot peened to plastically form the relatively thin surface layer 20c which remains in local compression after peening. The compressive surface layer 20c significantly enhances the fatigue life of the spar 20 which is subject to considerable centrifugal loading and stress during operation.

As shown in FIG. 4, the spar first side 20a includes the cavity 22 which is bounded in part by the compressive surface layer 20c, and is otherwise open toward the skin 24. The skin 24 closes the cavity 22 to complete the profile of the fan blade 18, and the adhesive 26 suitably secures the skin 24 to the spar 20 for maintaining the enhanced surface layer 20c inside the cavity 22 without heat affected degradation.

As discussed in the Background section, conventional metallic fusing bonding such as diffusion bonding, welding, and brazing are performed at substantially elevated temperature which diffuses or fuses the adjoining metal components together. However, the elevated temperatures associated with fusion bonding necessarily relieves the desirable compressive surface layer formed by shot peening which would, therefore, eliminate its fatigue life enhancing effectiveness.

In accordance with the present invention, the adhesive 26 is not a conventional fusion bond performed at undesirably high temperature, but is a suitable adhesive bonded at relatively low temperature, which does not relieve the preformed compressive surface layer 20c when applied to bond the skin 24 to the spar 20. Since the fan 18 typically operates at relative low temperature, any suitable adhesive 26 may be used depending upon the intended operating temperature of the fan 18. One type of suitable adhesive 26 is epoxy such as AF191 manufactured by the 3M Company of St. Paul, Minn. For military aircraft wherein the fan blades 18 are subject to higher temperature operation, higher temperature adhesives are required such as a Bismaleimid (BMI), for example, like MB255G manufactured by the Cytec Company of Havre de Grace, Md.

Since the adhesive 26 does not metallurgically fuse the skin 24 to the spar 20 it has limited strength capabilities. Accordingly, the spar 20 itself is preferably the sole structural, load bearing component of the blade 18 suitably fixedly joined to the rotor disk 16 as illustrated in FIG. 1. And the skin 24 is substantially thinner than the spar 20 and is not a structural, load bearing component, except for carrying its own weight, but is provided solely as an aerodynamic fairing to enclose the cavity 22 and collectively define with the spar 20 a suitable airfoil profile taking any conventional form.

As shown in an exemplary embodiment in FIGS. 1 and 2, the exposed portion of the spar first side 20a and covering skin 24 are coextensive and define the airfoil pressure side, with the laterally opposite spar second side 20b defining the airfoil suction side. The spar 20 also includes a root 20d and radially opposite tip 20e, and axially opposite leading and trailing edges 20f and 20g.

The cavity 22 may be provided in the spar 20 over any desirable extent for reducing overall weight of the blade 18 while still maintaining structural integrity of the spar 20. In the exemplary embodiment illustrated in FIG. 2, the cavity 22 is disposed suitably aft of the leading edge 20f for maintaining the structural integrity of the leading edge for accommodating typical foreign object damage, such as bird ingestion, with the spar 20 remaining solid metal from the leading edge 20f to the cavity 22 disposed at mid-chord as shown in FIGS. 2 and 3. The cavity 22 extends to the trailing edge 20g as close as practical. And as shown in FIG. 1, the cavity 22 may extend radially from above the root 20d to below the tip 20e so that the skin 24 extends both part-span and part-chord over the spar first side 20a. Or, the skin 24 may extend fully between the root and tip, as shown in phantom in FIG. 1, over any suitably configured cavity 22 or multiple cavities.

As shown in FIGS. 1-3, the skin 24 is generally flat and includes a generally flat perimeter 24a which overlaps the spar first side 20a around the entire extent of the cavity 22 for securely attaching the skin 24 to the spar 20. As shown in greater detail in FIG. 4, the skin perimeter 24a defines with the spar 20 a suitably long overlap 30 in which the adhesive 26 is disposed for fixedly joining the skin 24 to the spar 20 around the perimeter of the skin 24. The length of the overlap 30 is selected in conjunction with the strength characteristics of a specific adhesive 26 to adequately bond the skin 24 to the spar 20 for accommodating the aerodynamic and centrifugal loads on the skin 24 itself during operation.

As shown in FIG. 4, the skin 24 is preferably as thin as possible, and is typically substantially thinner than the thinnest portions of the spar 20. In one embodiment, both the spar 20 and the skin 24 may be formed of a suitable metal such as titanium, with the minimum thickness of the spar 20 being in the exemplary range of about 50 to 70 mils, and the thickness of the skin 24 being about 10 mils. As shown in FIG. 1, the skin 24 may be attached in full to the spar 20 so that the spar 20 solely supports itself and the skin 24 under centrifugal loading. The skin 24, therefore, does not carry centrifugal loads directly to the disk 26, but instead is carried by the spar 20.

Since the spar 20 is the sole structural, load carrying component of the blade 18, the cavity 22 is preferably smoothly tapered at the skin perimeter 24a as illustrated in FIGS. 2, 3, and 4 for reducing undesirable stress concentration thereat. Step, or sharp corner changes within the spar 20 around the cavity 22 are undesirable since they inherently produce stress concentration which should be avoided. As shown in FIGS. 2 and 4, the skin 24 blends smoothly with the exposed portion of the spar first side 20a around the skin perimeter 24a for effecting an aerodynamically smooth, airfoil-shaped outer surface of the collective spar 20 and skin 24.

Although the cavity 22 and skin 24 may be formed together on either the pressure or suction sides of the blade 18, in the exemplary embodiment illustrated in the FIGS., they are preferably disposed in the pressure side defined in part by the spar first side 20a. This is preferred for yet further increasing the strength of the spar 20.

More specifically, as shown in FIGS. 2 and 3 the suction side 20b of the blade has greater axial or chordal curvature than the pressure side defined by the skin 24 and the spar first side 20a. The spar 20 extends from the leading to trailing edges 20f and 20g and includes the airfoil suction side, with the greater curvature of the suction side increasing moment of inertia and bending stiffness thereof for improving the strength of the spar 20. The skin 24, in contrast, extends along at least a portion of the pressure side of the airfoil and has relatively little curvature. In this way, the spar 20 has greater strength than it would otherwise have if the cavity 22 and skin 24 were formed on the suction side thereof.

Although one or more cavities 22 may be formed in the spar 20 and remain hollow for reducing weight of the blades 18, in the preferred embodiment illustrated in FIGS. 1–4, the means for bonding the skin 24 to the spar 20 preferably also include a core or filler 32 which preferably completely fills the cavity 22 for additionally radially supporting the skin 24 to the spar 20 for reacting centrifugal loading of the skin 24 during operation. As shown in FIGS. 1 and 4, the filler 32 is in the preferred form of a honeycomb having cells 32a extending between the spar first side 20a and the adjoining skin 24 generally perpendicularly therebetween. The honeycomb filler 32 is fixedly joined or bonded to the spar 20 and skin 24 by a suitable adhesive such as the same adhesive 26 found in the overlap 30. The filler 32 may take any other suitable form such as ribs or trusses.

As indicated above, the relatively low temperature adhesive 26 ensures that the enhanced compressive surface layer 20c is maintained inside the cavity 22 without heat-affected compromise. The laterally extending honeycomb cells 32a ensure a laterally rigid support for the skin 24 on the spar 20 for accommodating aerodynamic pressure loads during operation. Since the laterally opposite ends of the honeycomb cells 32a are bonded to the skin 24 and spar 20, the skin 24 is supported over its entire surface area for carrying centrifugal loads of the skin 24 in shear through the filler 32 to the supporting spar 20.

The honeycomb filler 32 may be formed of any suitable material such as titanium; and allows the skin 24 to be made thinner than it otherwise would if unsupported inside its perimeter 24a. To further reduce weight, the skin 24 may be formed of a suitable non-metallic material such as polymeric or fiber reinforced composite, which may be suitably bonded to the spar 20 and filler 32.

The adhesive bonded fan blade 18 disclosed above now allows the fabrication of wide chord hollow fan blades using low cost, conventional manufacturing techniques. The cavity 22 may be readily machined into only one side of the spar 20 and suitably inspected for defects, and then conventionally shot peened for producing the fatigue-life enhanced surface layer 20c over the entire surface of the spar 20. The surface layer 20c may be otherwise conventionally formed for enhancing the fatigue life of the spar 20.

The skin 24 may be separately manufactured in thin sheet form and readily bonded to the spar 20 using the suitable adhesive 26. Since bonding of the skin 24 to the spar 20 does not elevate the temperature of the blade 18 beyond that temperature which would relieve the desirable compression in the surface layer 20c, the enhanced surface layer 20c remains without compromise.

The hollow fan blade 18 may enjoy an empty cavity 22 if desired, or various forms of the filler 32 may be used. The filler 32 may be used for additionally supporting the skin 24 as indicated above, and may also have a suitable composition and form for providing internal vibratory damping if desired.

Although the spar 20 is preferably a suitable high strength metal such as titanium, both the skin 24 and filler 32 may be made of suitable metals, or non-metal material such as polymerics to further reduce weight.

Any suitable adhesive 26 may be used as required for suitably bonding the skin 24 to the spar 20 for its intended operating environment under temperature and centrifugal loading. Since the adhesive 26 is preferably non-metallic, it provides an enhanced joint between the spar 20 and skin 24 in which any voids or defects do not act as potential crack initiation sites to the parent material of the spar 20. A void or defect in a conventional fused joint such as formed by diffusion bonding, welding, or brazing can promote crack initiation which can propagate into the adjoining parent material. However, the non-metallic adhesive 26 provides a disparate interface with the spar 20 which prevents propagation of any cracks in the adhesive 26 itself into the parent material of the spar 20. Accordingly, the inability to internally inspect the adhesive joint does not present the significant problems associated with the inability to inspect fusion bonds.

As indicated above, the skin 24 is preferably joined to the spar 20 at a suitable distance downstream from the leading edge 20f so that the leading edge portion of the spar 20 remains solid for resisting foreign object damage while minimizing the likelihood of damage to the thin skin 24. In alternate designs, the skin 24 may be used instead on the suction side of the blade providing further protection against foreign object damage thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A gas turbine engine fan blade comprising:
   a spar including first and second opposite sides having a fatigue-life enhanced surface layer, with said first side including a cavity bounded in part by said surface layer;
   a skin closing said cavity; and
   means for bonding said skin to said spar for maintaining said enhanced surface layer inside said cavity.

2. A blade according to claim 1 wherein said skin bonding means comprise an adhesive fixedly joining said skin to said spar.

3. A blade according to claim 2 wherein said skin includes a perimeter overlapping said spar first side around said cavity, and said adhesive is disposed therebetween to fixedly join said skin to said spar.

4. A blade according to claim 3 wherein said skin bonding means further comprise a filler disposed in said cavity for radially supporting said skin to said spar for reacting centrifugal loading of said skin.

5. A blade according to claim 3 wherein said filler is fixedly joined to said spar and skin by said adhesive for maintaining said enhanced surface layer inside said cavity.

6. A blade according to claim 5 wherein said filler comprises a honeycomb having cells extending between said spar first side and said adjoining skin, and fixedly joined thereto by said adhesive.

7. A blade according to claim 5 wherein said cavity is tapered at said skin perimeter for reducing stress concentration thereat.

8. A blade according to claim 5 wherein said surface layer is a shot-peened compressive layer.

9. A blade according to claim 5 wherein said skin is thinner than said spar, and attached in full to said spar so that said spar solely supports itself and said skin under centrifugal loading.

10. A blade according to claim 5 wherein:

said spar and skin are collectively configured to define an airfoil having laterally opposite pressure and suction sides, radially opposite root and tip, and axially opposite leading and trailing edges;

said suction side has greater curvature than said pressure side;

said spar extends from said leading to trailing edges, and includes said suction side for increasing moment of inertia thereof; and said skin includes at least a portion of said pressure side.

11. A blade according to claim 1 wherein said surface layer is a shot-peened compressive layer.

12. A blade according to claim 1 wherein said skin is thinner than said spar, and attached in full to said spar so that said spar solely supports itself and said skin under centrifugal loading.

13. A blade according to claim 1 wherein said spar has greater chordal curvature than said skin for increasing moment of inertia.

* * * * *